(12) United States Patent
Killalea et al.

(10) Patent No.: US 8,325,974 B1
(45) Date of Patent: Dec. 4, 2012

(54) RECOGNITION OF CHARACTERS AND THEIR SIGNIFICANCE WITHIN WRITTEN WORKS

(75) Inventors: Tom Killalea, Seattle, WA (US); Janna S. Hamaker, Issaquah, WA (US); Eugene Kalenkovich, Sammamish, WA (US)

(73) Assignee: Amazon Technologies Inc., Reno, NV (US)

( * ) Notice: Subject to any disclaimer, the term of this patent is extended or adjusted under 35 U.S.C. 154(b) by 867 days.

(21) Appl. No.: 12/415,889

(22) Filed: Mar. 31, 2009

(51) Int. Cl.
*G06K 9/00* (2006.01)
*G06F 7/00* (2006.01)
*G06F 17/30* (2006.01)

(52) U.S. Cl. ......... 382/100; 707/748; 707/750; 707/752

(58) Field of Classification Search .................. 382/100; 707/748, 750, 752
See application file for complete search history.

(56) References Cited

U.S. PATENT DOCUMENTS 7,783,644 B1 * 8/2010 Petrou et al. .................. 707/748
2005/0108630 A1 5/2005 Wasson et al.

OTHER PUBLICATIONS

Unknown, "About OpenCalais," http://www.opencalais.com/about, Dec. 8, 2008, 2 pgs., Thomson Reuters.
Valentin Tablan, Diana Maynard, Kalina Bontcheva, Hamish Cunningham, Gate—An Application Developer's Guide, Jul. 19, 2004, 39 pgs., University of Sheffield, UK.
Unknown, "Machine voice in text-to-speech by CaTS," http://www.itweb.co.za/office/cats/0708240709.htun, Aug. 24, 2007, 2 pgs., CaTS, Johannesburg.
Hamish Cunningham et al., "Appendix D, Named-Entity State Machine Patterns," Developing Language Processing Components with GATE Version 5 (a User Guide), http://gate.ac.uk/sale/tao/splitap4.html, 2001, 4 pgs., University of Sheffield, UK.
Hamish Cunningham et al., "Chapter 8 ANNIE: a Nearly-New Information Extraction System," Developing Language Processing Components with GATE Version 5 (a User Guide), http://gate.ac.uk/sale/tao/splitch8.html, 2001, 10 pgs., University of Sheffield, UK.
Unknown, "Natural Language Processing, Coreference Resolution," http://www.eng.utah.edu/~cs5340/slides/coref.4ps.pdf, Oct. 21, 2008, 4 pgs., University of Utah, US.
Unknown, "Speech Synthesis Markup Language (SSML) Version 1.0," http://www.w3.org/TR/speech-synthesis/#S3.2.1, Sep. 7, 2004, 29 pgs., W3C.
Unknown, "SNoW-Based NE Tagger," http://l2r.cs.uiuc.edu/~cogcomp/asoftware.php?skey=NE#tools, 2009, 1 pg., University of Illinois at Urbana-Champaign.

(Continued)

*Primary Examiner* — John Strege
(74) *Attorney, Agent, or Firm* — Lee & Hayes, PLLC

(57) ABSTRACT

Named entity recognition is applied to identify text strings corresponding to character identities in a written work. The textual strings are grouped according to character identity and, from each group, a primary name is selected. A significance is calculated for each of the character identities. The character identities including the primary names are presented in a catalog based on the calculated significance. In some embodiments, character identity identification results are refined by allowing users to vote regarding the significance of the character identities and by granting more weight to the votes of users with a close relationship to the written work.

17 Claims, 15 Drawing Sheets

OTHER PUBLICATIONS

William W. Cohen, Sunita Sarawagi, "Exploiting Dictionaries in Named Entity Extraction: Combining Semi-Markov Extraction Processes and Data Integration Methods," International Conference on Knowledge Discovery and Data Mining, http://portal.acm.org/citation.cfm?id=1014065, 2004, 6 pgs., Association for Computing Machinery, New York, NY, US.

Marin Dimitrov, Kalina Bontcheva, Hamish Cunningham, Diana Maynard, A Light-Weight Approach to Coreference Resolution for Named Entities in Text, 2003, 18 pgs., University of Sheffield, UK.

Hamish Cunningham, "Information Extraction—a User Guide (Second Edition)," http://www.dcs.shef.ac.uk/~hamish/IE/userguide/main.html, Apr. 1999, 9 pgs., University of Sheffield, UK.

Sharon Givon, Maria Milosavljevic, Extracting Useful Information from the Full Text of Fiction, May 30, 2007, 6 pgs., C.I.D., Paris, FR.

Deron Meranda, "Most Common Nicknames for First Names," http://deron.meranda.us/data/nicknames.txt, 2005, 8 pgs., Deron Meranda, US.

Brian Lalonde, "Lingua::EN::Nickname—Genealogical nickname matching," http://cpansearch.perl.org/src/BRIANL/Lingua-EN-Nickname-1.14/Nickname.pm, Oct. 6, 2003, 31 pgs., Brian Lalonde.

* cited by examiner

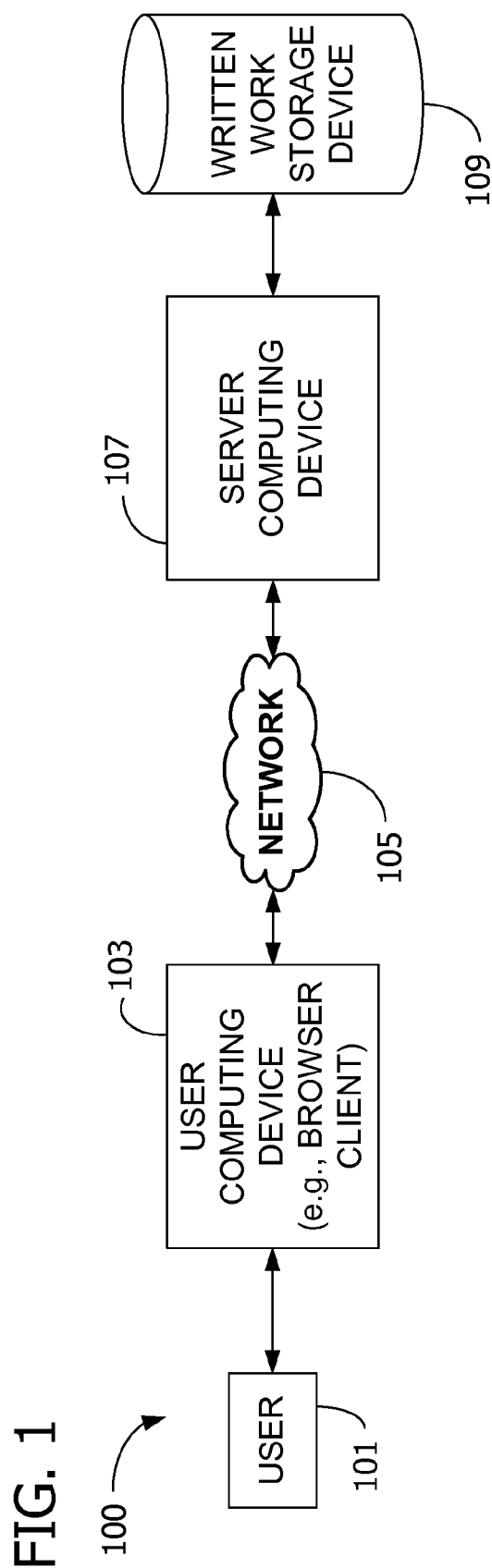

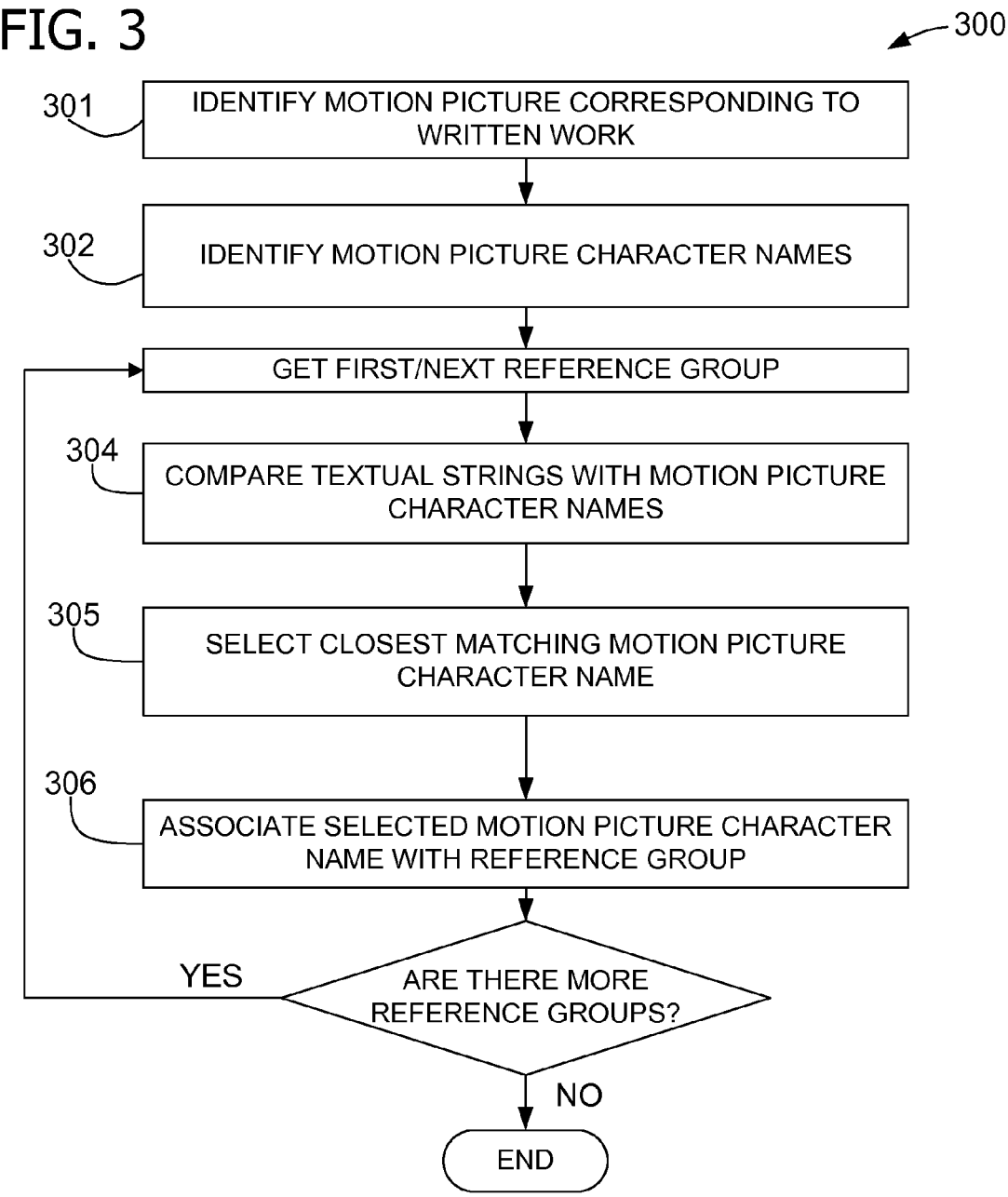

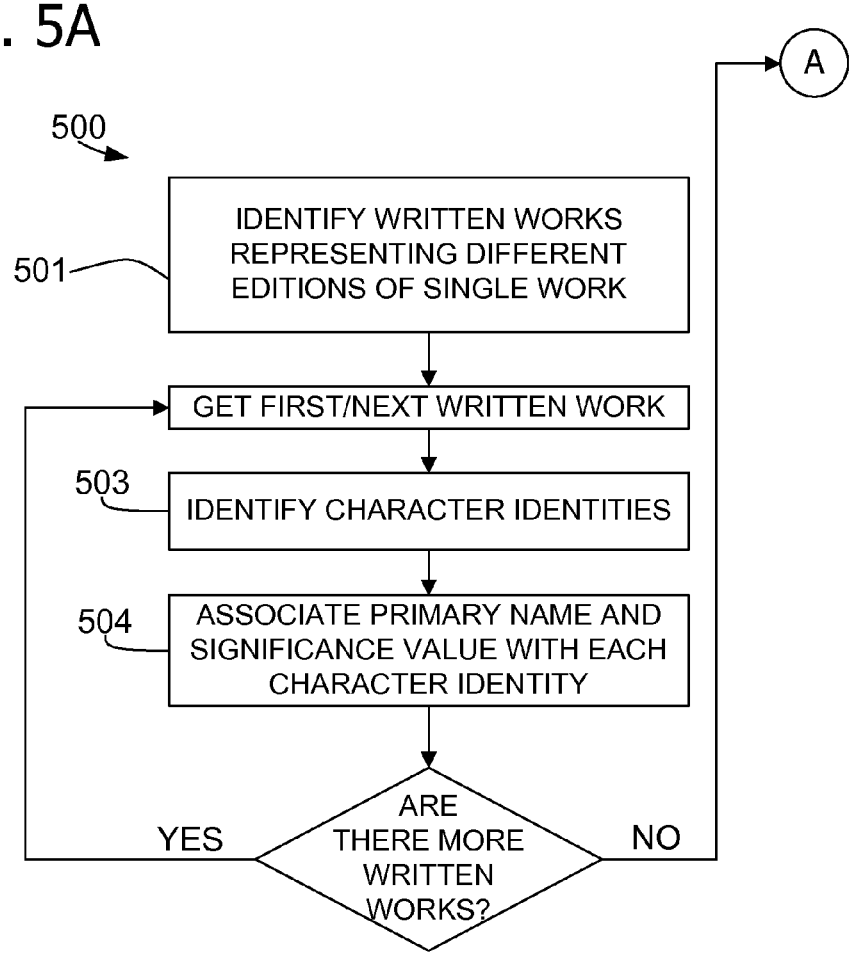
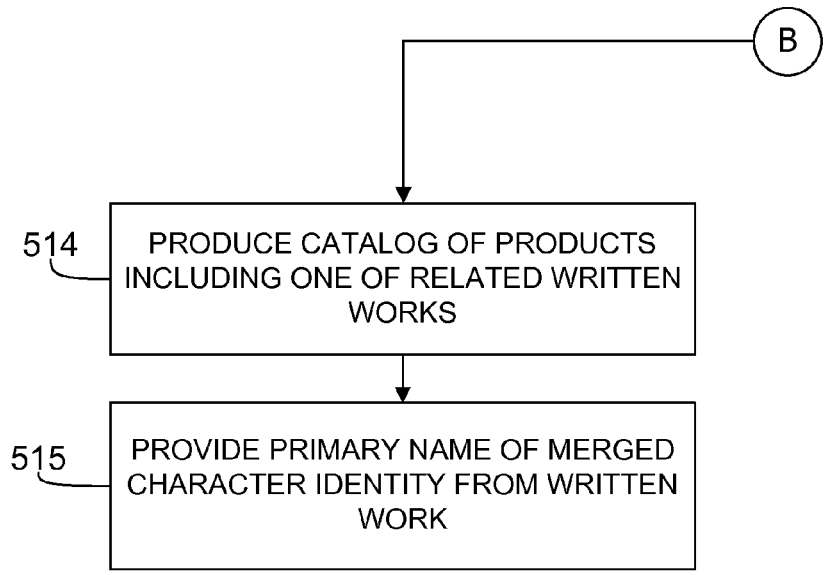
FIG. 5A

FIG. 13A

| Character | Absolute Frequency | Cumulative Frequency | Cumulative Percentage | Percent of Max Frequency |
|---|---|---|---|---|
| Character1 | 642 | 642 | 17.08 | 100.00 |
| Character2 | 494 | 1136 | 30.23 | 76.95 |
| Character3 | 414 | 1550 | 41.25 | 64.49 |
| Character4 | 253 | 1803 | 47.98 | 39.41 |
| Character5 | 246 | 2049 | 54.52 | 38.32 |
| Character6 | 191 | 2240 | 59.61 | 29.75 |
| Character7 | 165 | 2405 | 64.00 | 25.70 |
| Character8 | 150 | 2555 | 67.99 | 23.36 |
| Character9 | 130 | 2685 | 71.45 | 20.25 |
| Character10 | 96 | 2781 | 74.00 | 14.95 |
| Character11 | 86 | 2867 | 76.29 | 13.40 |
| Character12 | 75 | 2942 | 78.29 | 11.68 |
| Character13 | 71 | 3013 | 80.18 | 11.06 |
| Character14 | 68 | 3081 | 81.99 | 10.59 |
| Character15 | 62 | 3143 | 83.63 | 9.66 |
| Character16 | 59 | 3202 | 85.20 | 9.19 |
| Character17 | 51 | 3253 | 86.56 | 7.94 |
| Character18 | 44 | 3297 | 87.73 | 6.85 |
| Character19 | 38 | 3335 | 88.74 | 5.92 |
| Character20 | 38 | 3373 | 89.76 | 5.92 |
| Character21 | 36 | 3409 | 90.71 | 5.61 |
| Character22 | 28 | 3437 | 91.46 | 4.36 |
| Character23 | 25 | 3462 | 92.12 | 3.89 |
| Character24 | 21 | 3483 | 92.68 | 3.27 |
| Character25 | 18 | 3501 | 93.16 | 2.80 |
| Character26 | 17 | 3518 | 93.61 | 2.65 |
| Character27 | 16 | 3534 | 94.04 | 2.49 |
| Character28 | 14 | 3548 | 94.41 | 2.18 |
| Character29 | 14 | 3562 | 94.78 | 2.18 |
| Character30 | 14 | 3576 | 95.16 | 2.18 |
| Character31 | 13 | 3589 | 95.50 | 2.02 |
| Character32 | 12 | 3601 | 95.82 | 1.87 |
| Character33 | 11 | 3612 | 96.11 | 1.71 |
| Character34 | 9 | 3621 | 96.35 | 1.40 |
| Character35 | 8 | 3629 | 96.57 | 1.25 |
| Character36 | 7 | 3636 | 96.75 | 1.09 |
| Character37 | 7 | 3643 | 96.94 | 1.09 |
| Character38 | 6 | 3649 | 97.10 | 0.93 |
| Character39 | 6 | 3655 | 97.26 | 0.93 |
| Character40 | 6 | 3661 | 97.42 | 0.93 |
| Character41 | 6 | 3667 | 97.58 | 0.93 |
| Character42 | 6 | 3673 | 97.74 | 0.93 |
| Character43 | 5 | 3678 | 97.87 | 0.78 |
| Character44 | 5 | 3683 | 98.00 | 0.78 |
| Character45 | 5 | 3688 | 98.14 | 0.78 |
| Character46 | 5 | 3693 | 98.27 | 0.78 |
| Character47 | 5 | 3698 | 98.40 | 0.78 |

FIG. 13B

| Character | Absolute Frequency | Cumulative Frequency | Cumulative Percentage | Percent of Max Frequency |
|---|---|---|---|---|
| Character48 | 4 | 3702 | 98.51 | 0.62 |
| Character49 | 4 | 3706 | 98.62 | 0.62 |
| Character50 | 4 | 3710 | 98.72 | 0.62 |
| Character51 | 4 | 3714 | 98.83 | 0.62 |
| Character52 | 4 | 3718 | 98.94 | 0.62 |
| Character53 | 4 | 3722 | 99.04 | 0.62 |
| Character54 | 4 | 3726 | 99.15 | 0.62 |
| Character55 | 3 | 3729 | 99.23 | 0.47 |
| Character56 | 3 | 3732 | 99.31 | 0.47 |
| Character57 | 3 | 3735 | 99.39 | 0.47 |
| Character58 | 3 | 3738 | 99.47 | 0.47 |
| Character59 | 3 | 3741 | 99.55 | 0.47 |
| Character60 | 3 | 3744 | 99.63 | 0.47 |
| Character61 | 2 | 3746 | 99.68 | 0.31 |
| Character62 | 2 | 3748 | 99.73 | 0.31 |
| Character63 | 2 | 3750 | 99.79 | 0.31 |
| Character64 | 2 | 3752 | 99.84 | 0.31 |
| Character65 | 2 | 3754 | 99.89 | 0.31 |
| Character66 | 2 | 3756 | 99.95 | 0.31 |
| Character67 | 2 | 3758 | 100.00 | 0.31 |

FIG. 13C

| Character | Significance Value |
|---|---|
| Jane | 0.3 |
| Jane Doe | 0.5 |
|  |  |
| Combined | 0.8 |

RECOGNITION OF CHARACTERS AND THEIR SIGNIFICANCE WITHIN WRITTEN WORKS

BACKGROUND

Written works such as works of fiction often contain a large number of characters. While some written works include a character list to help the reader remember the identity and significance of these characters while reading the written work, many works do not. For such works, remembering all the characters in a written work becomes difficult for the reader especially when the work includes various names for the characters (e.g., Tom, Tommy, Thomas, etc.). This difficulty may result in confusion and lack of comprehension on the part of the reader, rendering the reading experience less enjoyable.

Automated methods for recognizing "named entities" (e.g., a person or place) in a body of text are known. These methods include the ability to determine whether different strings (e.g., "John Smith", "Mr. Smith", and "John") refer to the same named entity. Further, existing methods and systems can determine a relative significance of a named entity based on the quantity of references to that named entity in the text.

The existing methods have been applied primarily to relatively short works, such as news reports, and highly specialized scientific works such as biomedical texts. Further, these methods involve a compromise between accuracy and completeness (e.g., the number of named entities identified). Therefore, configuring a named entity recognition system to return a greater number of named entities (e.g., higher completeness) necessarily results in an increased error rate (e.g., lower accuracy). Configuring for high accuracy dictates that some named entities will be omitted (e.g., lower completeness). In existing systems, the results are manually corrected, which is labor intensive and thus expensive.

BRIEF DESCRIPTION OF THE DRAWINGS

FIG. 1 is a block diagram illustrating an example system according to an embodiment in which a client computing device communicates with a server computing device and a written work storage device via a network.

FIG. 3 is an example flow chart for comparing identified character identities with motion picture characters from a motion picture corresponding to the written work and associating a closest matching motion picture character name with each character identity.

FIGS. 5A and 5B are an example flow chart for merging character identities from different editions of a single written work and providing merged character identity names with one of the editions of the single written work in a catalog.

FIGS. 13A and 13B depict an example table used in calculating significance values for character identities.

FIG. 13C depicts an example table used in calculating a cluster score for named entities.

Corresponding reference characters indicate corresponding parts throughout the drawings.

DETAILED DESCRIPTION

Figure 2A:
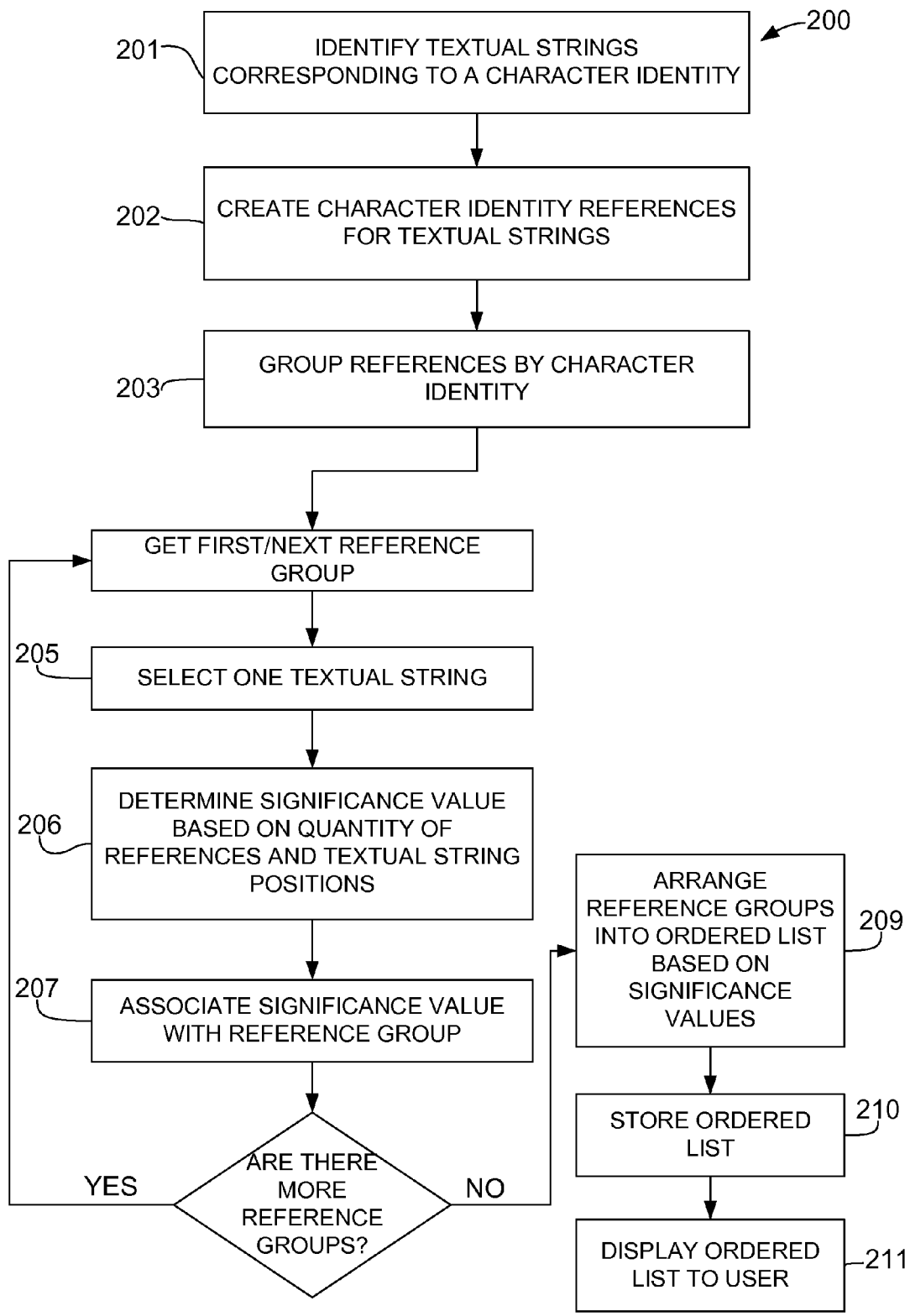
FIG. 2A is an example flow chart for identifying and determining a significance value for character identities in a written work.

Disclosed embodiments enable the identification of character identities in a written work with a system such as illustrated in the system 100 of FIG. 1. In such embodiments, the identification of character identities generally comprises identifying named entities within the written work, determining a significance value for each, and then storing the identified character identities along with their significance values. The embodiments are not limited to specific types of written works such as works of fiction or biographies, as other types of written works are also contemplated. Written works include all forms of fiction (e.g., novels, short stories) and non-fiction (e.g., biographies, historical books), including combinations of fiction and non-fiction such as historical fiction.

Providing a list of characters from a written work can help a reader better comprehend the work, especially when the work contains a large number of characters. One can reference the list of characters periodically if one forgets the role a particular character plays or the relationship between two or more characters. The initial extraction of character names from a written work can be performed in an automated system. To provide value to a user, the extraction results may be refined by exposing the character list to modification by a community of users. For example, the initial extraction may identify a location as a character, assign too much or too little significance to a given character, or produce two unique results for a single character. A user can detect these errors and submit corrections. In addition, a user may be given the ability to provide a description of the character. Refining the results in this manner distributes the effort across many parties.

The list of characters generated by the present disclosure may also be provided to a web site for display and to drive Internet traffic to the site. Advertisements and links to purchase the corresponding written work may also be available on the web site.

While the term "character identity" is described in some embodiments herein with reference to a person, the term "character identity" in some embodiments includes any object referenced by the written work. Example character identities include people, personas, institutions, animals, machines, products, and devices. Character identities may be human, animal, supernatural, mythical, or divine. A written work may personify a thing, a place, or an intangible concept, thereby producing a character identity. Aspects of the disclosure are also operable with other entities such as non-personified places, landmarks, or periods of time.

Disclosed embodiments utilize a server computing device 107 to process the written work. A user 101 accesses a user computing device 103 such as a browser client to view character identity information presented thereon. Character identity information is communicated to the user computing device 103 through a network 105. The network 105 is any type of network that communicatively couples computing devices. Examples of the network 105 include the Internet, a peer to peer (P2P) network, a local area network (LAN), or a wide area network (WAN).

The user computing device 103 is any device capable of accessing the network 105 and presenting character identity information to the user 101. By way of example only, and not limitation, these devices include a laptop, a desktop computer, a set-top box, a handheld device such as an electronic book reader, a cellular phone or smart phone, or a video gaming device. The user computing device 103 includes a form of computer-readable media that stores, among other things, applications or programs. The user computing device 103 includes a user input device that enables the user 101 to enter information into the user computing device 103. These include, for example, a keyboard, a pointing device, or an audio input device. The user computing device 103 also includes one or more output devices, such as a graphical display device or an audio output device.

Stored on the computer-readable media associated with the user computing device 103 is a user interface such as, among other possibilities, a web browser. Web browsers enable users, such as user 101, to display and interact with media (e.g., the written works) and other information typically embedded on a web page or a website on the server computing device 107.

Server computing device 107 is communicatively coupled through the network 105 to the user computing device 103. Server computing device 107 is any type of server that contains a processor operable to execute computer executable instructions and a memory to store and retrieve information. In some embodiments, the server computing device 107 hosts an e-commerce website. The server computing device 107 is communicatively coupled to a written work storage device 109, upon which written works and related information (metadata) are stored. Written works can take the form of individual files corresponding to a particular work, or a number of individual files may form a single work. The written work storage device 109 can be a form of computer-readable media, such as a hard disk drive or optical disk drive. In some embodiments, the written work storage device 109 is integrated with the server computing device 107.

In one embodiment, the invention is implemented as a system 100. The system 100 includes a memory area, which may take the form of written work storage device 109, for storing a written work having a plurality of character identities therein. The written work may be stored as text, with or without formatting, such that the processor may easily parse the work. In text format, the work may take the form of a plain text file, electronic book (e-book), word processor document, or any other suitable format. Alternatively, the written work may be stored as scanned images from a physical copy of the work; in this scenario, prior to processing the work, the images are pre-processed by optical character recognition (OCR) software to produce parseable text.

Referring to FIG. 2A, an example flow chart 200 for identifying and determining a significance value for character identities in a written work is provided. The system (100 of FIG. 1) may also include a processor, which may be included in server computing device 107, configured to identify textual strings 201 within the written work stored in the memory area, each textual string corresponding to one of the plurality of character identities. The textual strings can be identified using named entity recognition (NER) software such as CRF-Classifier from the Natural Language Processing Group at Stanford University or GATE and ANNIE from the Natural Language Processing Group at the University of Sheffield. The NER software detects in the work textual strings (references) which refer to a character (referent). The NER software further identifies "coreferent" references, which share a common referent, and resolves them, such that a single referent is associated with multiple textual strings. In the context of a written work, a single character identity may be associated with multiple strings, some of which may be duplicates (e.g., "John Smith" in two different sentences), and some of which may be distinct (e.g., "John Smith" in one sentence, and "Mr. Smith" in another). Because characters may sometimes be referred to using a nickname, the NER software may be configured to consult a gazette or dictionary mapping nicknames to standard or canonical names. Such a feature allows "Johnny", for example, to be resolved as coreferent with "John". Nickname resolution may be provided through existing software. In some embodiments, a user may specify a list of nicknames prior to processing the written work.

The processor creates character identity references 202 for each of the identified textual strings. The character identity references include a textual string position of one of the identified textual strings within the written work. The position may indicate an offset from the beginning of the work, measured in words or letters. Alternatively, or in addition, the work may be decomposed into sections, such as chapters and/or paragraphs, and the position may indicate the section in which the textual string appears as well as a location of the textual string in the section.

The processor is further configured to group 203 the created character identity references by character identity to create reference groups. For each of the reference groups, the processor selects 205 one of the textual strings from the character identity references in the reference group. The processor determines 206 a significance value for the reference group based on a quantity of the character identity references in the reference group and the textual string positions of the textual strings in the reference group. The processor also associates 207 the determined significance value with the reference group.

In some embodiments, the significance of the character identity is determined by both the number of references to the character and the positions of those references in the work. Other embodiments, however, may determine the significance of the character identity in other ways still within the scope of the present disclosure.

The quantity of references, or frequency, may be calculated in various ways. In analyzing the reference groups, an absolute frequency or total number of references may be identified for each character as illustrated in the second column of Table 1 below. Table 1 represents an excerpt from the table depicted in FIGS. 13A and 13B.

TABLE 1

Exemplary Frequency of Characters.

| Character | Absolute Frequency | Cumulative Frequency | Cumulative Percentage | Percent of Max Frequency |
|---|---|---|---|---|
| Character1 | 642 | 642 | 17.08 | 100.00 |
| Character2 | 494 | 1136 | 30.23 | 76.95 |
| Character3 | 414 | 1550 | 41.25 | 64.49 |
| Character4 | 253 | 1803 | 47.98 | 39.41 |
| Character5 | 246 | 2049 | 54.52 | 38.32 |
| ... | | | | |
| Character66 | 2 | 3756 | 99.95 | 0.31 |
| Character67 | 2 | 3758 | 100.00 | 0.31 |

Starting with the character having the highest frequency, a cumulative frequency may be calculated, as shown in the third column of Table 1. The character with the highest absolute frequency has a cumulative frequency equal to its absolute frequency. For other characters, the cumulative frequency is calculated by adding that character's absolute frequency to the previous character's cumulative frequency.

A cumulative percentage, illustrated in the fourth column of Table 1, can be calculated by dividing a character's cumulative frequency by the highest cumulative frequency calculated for any character. In the example of Table 1, Character 67 has a cumulative frequency of 3758. Each character's cumulative percentage is therefore determined by dividing the character's cumulative frequency by 3758. As illustrated in Table 1, cumulative percentage is inversely proportional to significance, as a low cumulative percentage indicates a high significance. The cumulative percentage may be normalized such that it is directly proportional to significance by, for example, subtracting each character's cumulative percentage from 100. In the example provided, Character 1 would have a normalized cumulative percentage of 82.92, and Character 67 would have a normalized cumulative percentage of 0.0.

A percentage of the maximum frequency, shown as the fifth column in Table 1, may be calculated by dividing a character's absolute frequency by the highest absolute frequency recorded. In the example provided, Character 1 has an absolute frequency of 642. Each character's percentage of maximum frequency is therefore determined by dividing the character's absolute frequency by 642. The resulting percentage of maximum frequency is directly proportional to significance.

It should be noted that the examples above are provided for illustrative purposes only. Other methods of frequency calculation are contemplated, and multiple measures of frequency may be associated with the character identity. In particular, it may be preferred to express significance as a probability that the character identity is significant in the written work.

In the embodiment depicted in FIG. 2A, the position of each reference to a character is also considered when determining significance. The frequency of mention, whether in absolute or proportional terms, may generally indicate a character's significance within a work, but using this metric alone can produce inaccurate results in some cases. For example, an introduction to a work of fiction may include references to real people such as the author or people in the author's life, or it may refer to characters in other books written by the author. The approach described allows less weight or no weight to be applied to references which occur in particular areas of a work, such as an introduction. Sections of a work may be identified based on metadata associated with the work, such as may be used to identify chapters and introductory portions in an e-book. Particular sections of interest, such as introductions, may be identified by searching for titles such as "Introduction", "About the Author", or "Prologue". Searching for other suitable titles to identify particular sections is contemplated, as well.

In addition, it is contemplated that the written work may be decomposed into sections such as chapters or paragraphs. In this case, the NER software may be executed and significance values calculated for each section. The results corresponding to each section of the work may then be combined, for example, through averaging by arithmetic mean or median, though other methods of combination are also contemplated.

Regardless of the method used for calculating significance values, it may be preferred to express significance as a probability that the textual strings in a reference group refer to a character identity. Significance values may thus range from 0 to 1, with a value of 1 representing the highest probability of reference to a character identity. To express significance as a probability, one may define a maximum significance value and divide the significance value of a reference group by the defined maximum significance value, though other methods of expressing significance as a probability are also contemplated.

The processor arranges 209 the reference groups based on the determined significance values to create an ordered list of the reference groups. The processor is further configured to store 210 the ordered list of the reference groups in the memory area for association with the written work. The processor may further display 211 the ordered list of the reference groups to a user of the system.

Figure 2B:
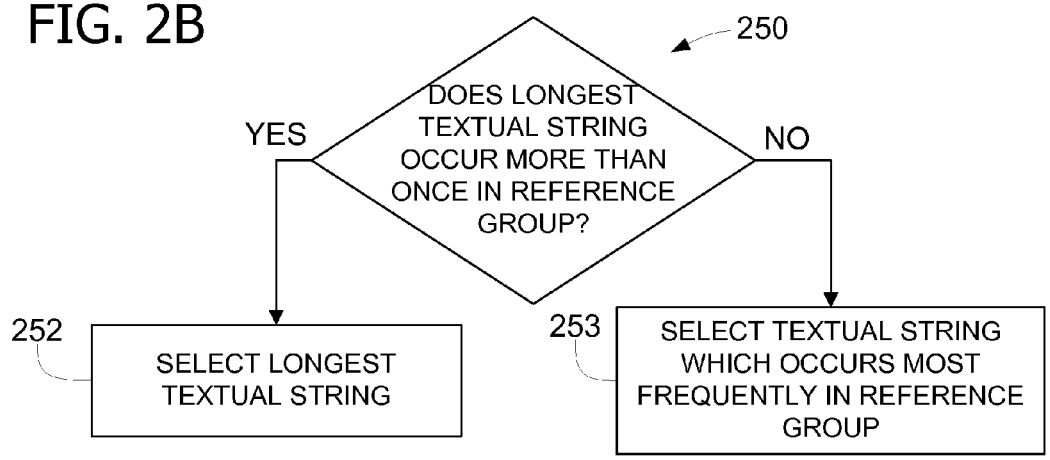
FIG. 2B is an example flow chart for selecting a textual string from character identity references in a reference group.

FIG. 2B depicts a flow chart representing one strategy for selecting 205 a textual string from character identity references in a reference group. The flow chart 250 of FIG. 2B demonstrates the selection 205 of a textual string from the character identity references in the reference group by selecting 252 the longest textual string in the reference group if the longest textual string occurs more than once in the reference group. If the longest textual string does not occur more than once, the textual string which occurs most frequently 253 in the reference group is selected.

In some embodiments, a textual string is selected from the character identity references in the reference group by comparing at least a portion of each of the textual strings in the reference group with a collection of standard names. The textual string in the reference group which most closely matches one of the names in the collection of standard names is then selected. In some embodiments, comparing a portion of a textual string to a collection of standard names includes comparing a first name of a character to a mapping of nicknames to standard or canonical names. In these embodiments, for example, "John" may be selected over "Johnny", even though "Johnny" appears more frequently in the work. The comparison of other portions of textual strings to other collections of standard names is also contemplated.

In some embodiments, a textual string is selected from the character identity references in the reference group by creating a subset of textual strings from the character identify references in the reference group which are not a substring of any other textual string in the reference group. From that subset, one of the textual strings is selected. For example, the string "Meg" is contained in, and is therefore a substring of, the string "Megan". The string "Meg" is thus excluded from selection for the reference group. It should be noted that the strategies for selecting a textual string provided above are merely examples. Other methods are also contemplated.

Referring next to FIG. 3, an example flow chart 300 illustrates a process for comparing identified character identities with motion picture characters from a motion picture corresponding to the written work and associating a closest matching motion picture character name with each character identity. A motion picture corresponding to the written work is identified 301, and a collection of motion picture character names from the identified motion picture is determined 302. For each of the reference groups, the textual strings in the reference group are compared 304 with the collection of motion picture character names. The motion picture character name from the collection of motion picture character names which most closely matches the textual strings in the reference group is selected 305, and the selected motion picture character name is associated 306 with the reference group.

In some embodiments, the significance value of a reference group is adjusted based on the significance of a corresponding motion picture character name. Initially, a significance of the selected motion picture character name relative to the other motion picture character names in the identified collection of motion picture character names is determined. The significance value of the reference group is adjusted based on the determined significance of the selected motion picture character name. In one embodiment, the significance of the selected motion picture character is determined by the position of the motion picture character in a cast listing, which may be sorted by order of appearance, frequency of appearance, or some other order.

In some embodiments, the significance of a character identity is adjusted upward based on the inclusion of the character identity in other works. For example, one may consider works related to the written work, such as a sequel, prequel, adaptation, screenplay, movie, abridged or lengthened written work, synopsis or summary, marketing material, review, translation, or index.

In some embodiments, works unrelated to the written work may also be considered in determining the significance of a character identity, determining a canonical name for the character identity, or identifying relationships between character identities. For example, a historical figure may appear as "Smith" in a work of historical fiction. The appearance of a "John Smith" in a work related to the same subject matter or character identities as the work of historical fiction may indicate that Smith's full or canonical name is John Smith. Further, similar relationships between character identities in two works may improve confidence when determining significance or a canonical name. Other works considered may include books, web pages, reference materials, or any other work containing character identities from the written work.

Figure 4:
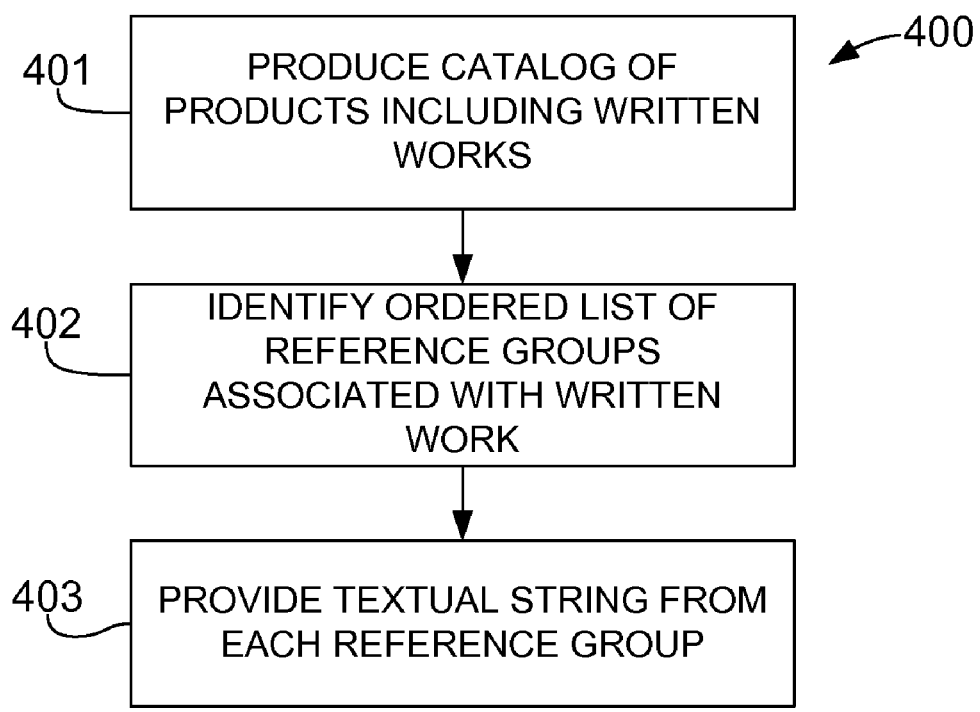
FIG. 4 is an example flow chart for providing character identity names with written works in a catalog.

Referring next to FIG. 4, an example flow chart 400 describes a method for providing character identity names with written works in a catalog. A catalog of products is produced 401, wherein the products include written works. For at least one of the written works in the catalog, the ordered list of the reference groups associated with at least one of the written works is identified 402. At least one of the written works is provided 403 with the selected textual string from at least one of the reference groups in the identified list of reference groups. The selected textual strings may be sorted based on characteristics of the corresponding reference groups. For example, the textual strings may be provided in order of frequency, order of significance, or order of appearance, where the first appearance of a reference group is determined by the earliest position of a character identity reference in the reference group.

In one embodiment, the selected textual string is a primary name for the character identity. In addition to the primary name, a description of the character may be provided. In another embodiment, the catalog is electronically displayed to a user. For a listed character identity, a link to additional character information is provided. In one embodiment, the additional character information is provided by user-editable pages in a website, such as in a "wiki." Changes may include, for example, adding a character, editing a character, and deleting a character. Changes may take effect immediately upon submission or may be treated as pending changes and displayed as such to other users of the website. The other users may be allowed to indicate agreement or disagreement with the pending changes, and the system may make the pending changes effective based on agreement or remove the pending changes based on disagreement.

In some embodiments, the character identities provided in a catalog are limited to those with a significance value over a significance threshold. Initially, a significance threshold is defined to limit the number of characters identified in a catalog. Based on the defined significance threshold, reference groups associated with the at least one written work exceeding the threshold are selected for inclusion in the catalog.

A significance threshold value may be defined according to any measure(s) of significance associated with character identities, as illustrated in Table 1 and FIGS. 13A and 13B, though other measures of significance are also contemplated. The threshold may be expressed, for example, as a minimum absolute frequency (e.g., 100 references), a minimum normalized cumulative percentage (e.g., 20%), or a minimum percentage of maximum frequency (e.g., 10%). The threshold may also be defined as a function utilizing metadata about the written work, such as length in pages or words (e.g., 1 reference for every 50 pages). The threshold may also be defined as a fixed number (e.g., 30) or percentage (e.g., 80%) of the characters identified. If significance is expressed as a probability between 0 and 1, a significance threshold value may be expressed as a minimum probability such as 0.7.

In one embodiment, the catalog is electronically displayed to a user, and for a listed reference group (e.g., representing a character identity), a link to additional character information is provided. The additional character information may include information about only the character identity corresponding to a link or may include information about characters from the written work meeting a significance threshold lower than the significance threshold applied when displaying character identities with the written work in the catalog.

In some embodiments, a user of a website is allowed to add a character that is not displayed for a written work. The user submits a character name, which the system compares against the list of identified character identities for the work. If the submitted character name matches or closely resembles a character name in the list with a significance value below the significance threshold, the system may adjust the character's significance or override the significance threshold requirement for the character, such that the character is later displayed for the written work. If the submitted character name did not exactly match the corresponding character name in the list, the corresponding name in the list will be used when later displaying the character. In another scenario, the submitted character name may not match or resemble any character in the list of identified character identities for the work. The addition of the submitted character name may be recorded as a pending change for the written work. The pending change may be displayed to other users, who may be allowed to vote for (approve) or against (disapprove) the pending change. The system may make a pending change effective if it receives a specified number of approving votes. Conversely, the system may remove a pending change if it receives a specified number of disapproving votes or if it fails to receive a specified number of approving votes in a specified amount of time.

Figure 5B:
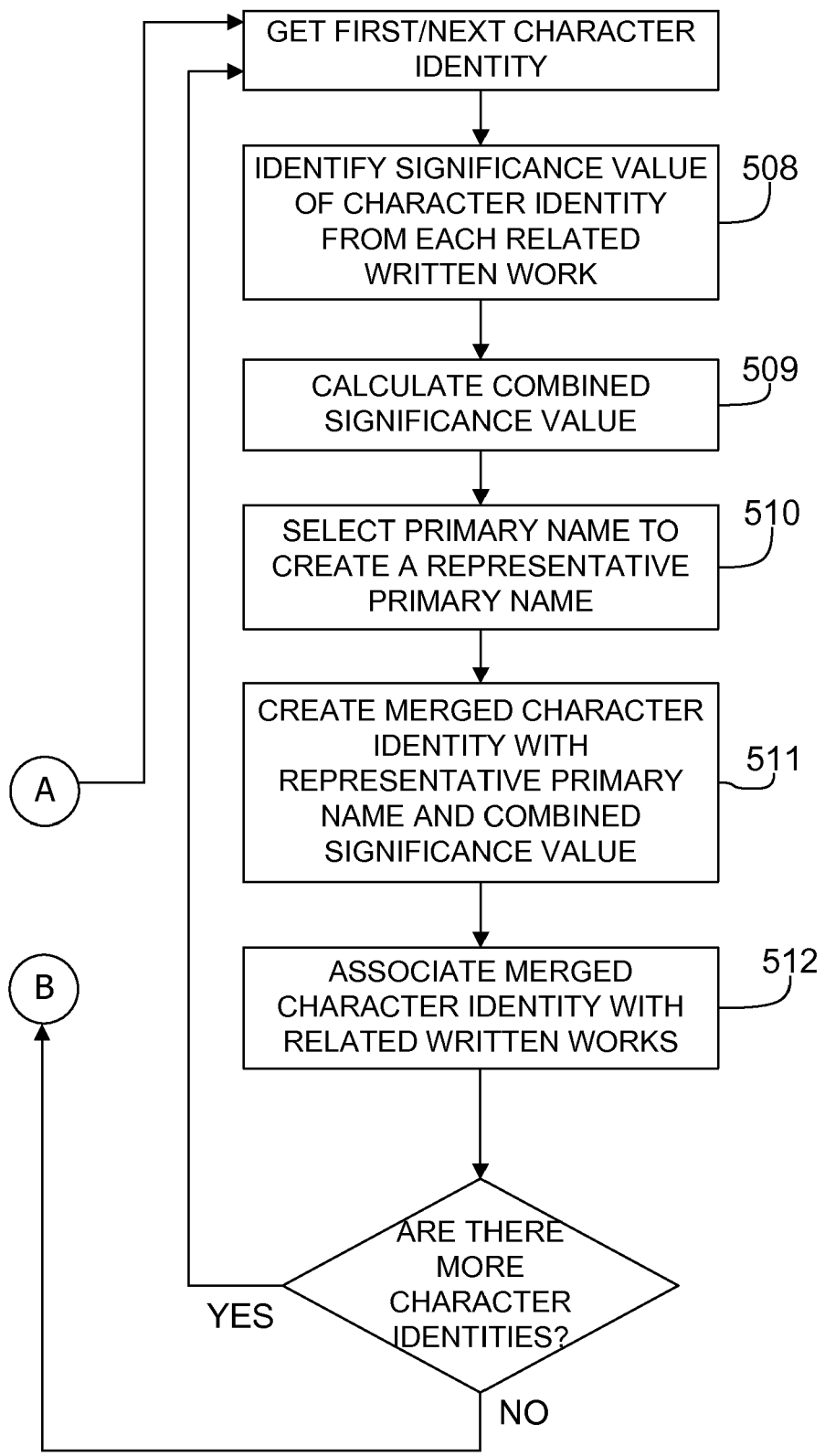

Referring next to FIG. 5A and FIG. 5B, an example flow chart 500 presents a process for merging character identities from different editions of a single written work and providing merged character identity names with one of the editions of the single written work in a catalog. A group of related written works is identified 501, said related written works representing different editions of a single written work. In one embodiment, the related written works represent different printings of a written work. In another embodiment, the related written works represent revisions to a single written work. In either embodiment, it is expected that the content of the written work, for purposes of identifying character identities, does not differ substantially between the related written works.

For each of the written works in the identified group of related written works, character identities within the written work are identified 503, and each character identity is associated 504 with a primary name and a significance value. For each of the identified character identities, the significance value of the character identity from each written work in the identified group of related written works is identified 508 to create a collection of significance values. A combined significance value from the collection of significance values is also calculated 509, and the primary name from one of the written works in the group of related written works is selected 510 to create a representative primary name. Based on the selected primary name, a merged character identity having a primary name equal to the created representative primary name and a significance value equal to the calculated combined significance value is created 511. The merged character identity is then associated 512 with each written work in the group of related written works.

Continuing with the routine 500, a catalog of products is produced 514 that includes at least one written work in the identified group of related written works. For each written work, the primary name of at least one merged character identity associated with the written work is provided 515 in the catalog.

In the process depicted by FIGS. 5A and 5B, a merged character identity may be used in place of the separate characters from which it was derived. In this way, character identities can be shared among related written works, reducing the total number of characters and, therefore, reducing the effort required to refine and maintain character information. The combined significance value of a merged character identity may be calculated as an arithmetic median or mean, for example, though other methods of calculation are also contemplated.

A representative primary name may be chosen for the merged character identity using methods similar to those used for selecting a textual string from a reference group, as depicted in FIG. 2B.

In some embodiments, a significance value for a character identity is determined based on the quantity and positions of references to the character identity in the written work.

Figure 6A:
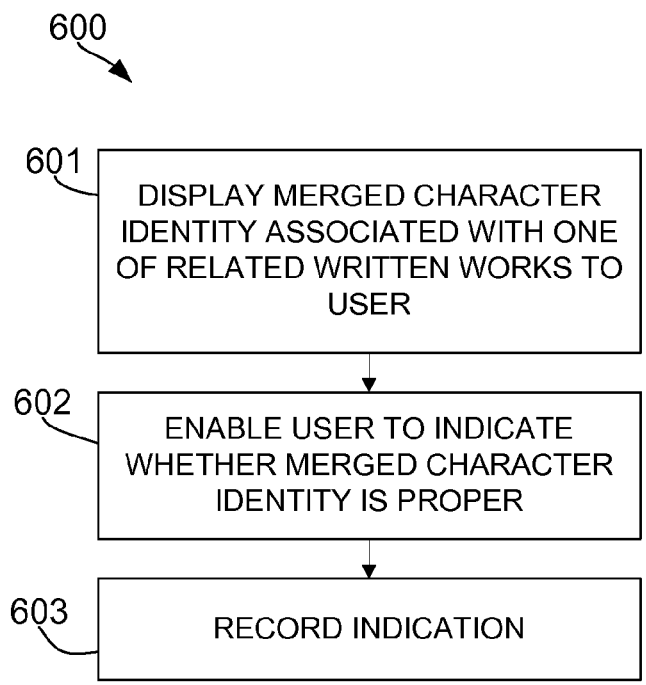
FIG. 6A is an example flow chart for enabling a user of a computer system to indicate whether a merged character identity is a proper character identity.

Referring next to FIG. 6A, an example flow chart 600 describes a process for enabling a user of a computer system to indicate whether a merged character identity is a proper character identity. At least one merged character identity associated with a written work in the identified group of related written works is displayed 601 to a user of the computer system, and the user is enabled 602 to indicate whether the at least one merged character identity is a proper character identity. In response to the user indicating whether the at least one merged character identity is a proper character identity, the indication is recorded 603.

Figure 6B:
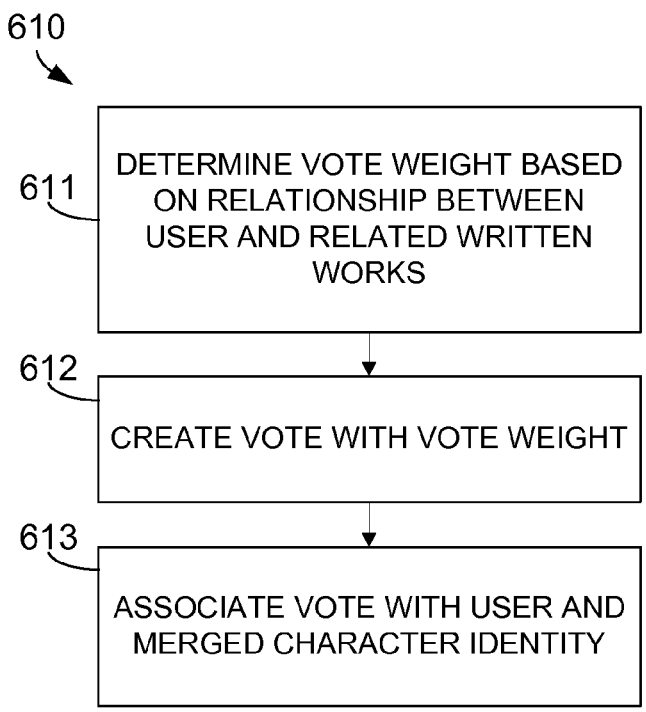
FIG. 6B is an example flow chart for weighting the indication of a user based on a relationship between the user and the written works corresponding to the merged character identity.

Referring next to FIG. 6B, an example flow chart 610 presents exemplary means for weighting the indication of a user based on a relationship between the user and the written works corresponding to the merged character identity. The flow chart 610 provides additional details for recording 603 (FIG. 6A) the indication. In this example, recording an indication includes determining 611 a vote weight for the user based on a relationship between the user and the written works in the identified group of written works, creating 612 a vote having a weight value equal to the determined vote weight, and associating 613 the created vote with the user and the at least one merged character identity.

In some cases, the merging of character identities across the related written works may occur after users have indicated whether identified character identities are proper character identities for individual works. For example, a character identity may have three votes for one work and two votes for a second, related work. The votes are aggregated across the related works, but one vote is considered per combination of user and character identity, in some embodiments. In the example given, a total of five votes (three from one work, two from the other) may be considered for the character identity. If, however, one user submitted a vote for the character identity for each of the works, only one of that user's votes would be considered, resulting in a total of four votes.

Figure 7:
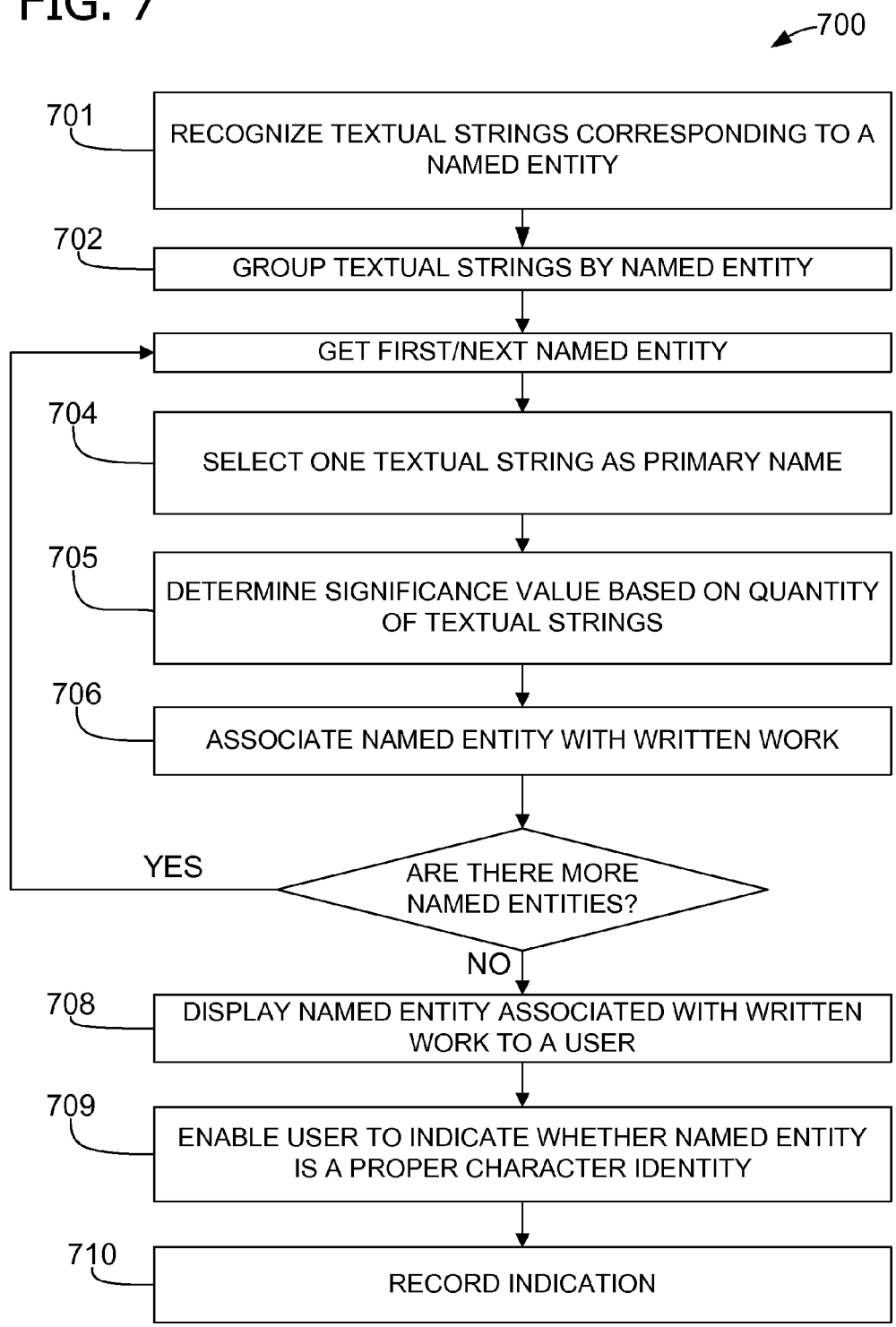
FIG. 7 is an example flow chart for recognizing character identities in a written work.

Referring next to FIG. 7, an example flow chart 700 depicts a method for recognizing character identities in a written work. Textual strings are recognized 701 within the written work, each textual string corresponding to one of a plurality of named entities and having a position within the written work. Upon recognition, the textual strings are grouped 702 by named entity. For each of the named entities, one of the textual strings corresponding to the named entity is selected 704 as a primary name for the named entity. A significance value is determined 705 for the selected named entity based on a quantity of textual strings corresponding to the named entity, and the named entity is associated 706 with the written work. At least one named entity associated with the written work is then displayed 708 to a user. The user is enabled 709 to indicate whether the displayed named entity is a proper character identity of the work. In response to the user indicating whether the displayed named entity is a proper character identity, the user's indication is recorded 710.

Figure 8A:
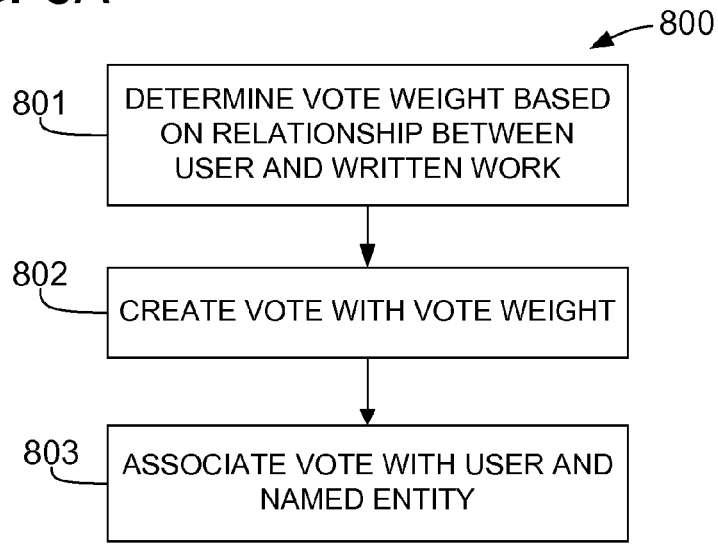
FIG. 8A is an example flow chart for recording the indication of a user as a vote with a vote weight based on a relationship between the user and the written work.

Referring next to FIG. 8A, an example flow chart 800 presents a process for recording the indication of a user (710 of FIG. 7) as a vote with a vote weight based on a relationship between the user and the written work. In the flow chart 800, a vote weight is determined 801 for the user based on a relationship between the user and the written work, and a vote is created 802 having a weight value equal to the determined vote weight. The created vote is then associated 803 with the user and the named entity.

Figure 8B:
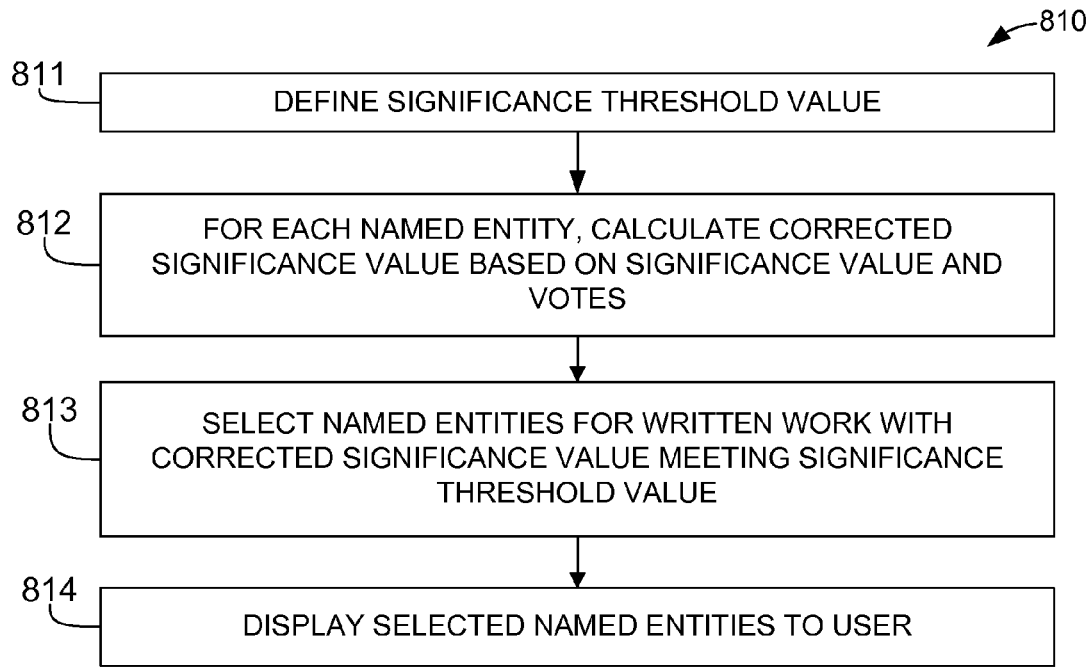
FIG. 8B is an example flow chart for limiting named entities displayed to a user based on the significance value of and votes associated with each named entity.

Referring next to FIG. 8B, a flow chart 810 depicts exemplary means for limiting named entities displayed to a user at block 708 (FIG. 7) based on the significance value of, and votes associated with, each named entity. In the flow chart 810, a significance threshold value is defined 811. For each of the named entities associated with the written work, a corrected significance value is calculated 812 based on the significance value of the named entity and the votes associated with the named entity. The method further selects 813 from the named entities associated with the written work, the named entities having a calculated corrected significance value equal to or greater than the defined significance threshold value. The selected set of named entities is then displayed to the user 814.

In some embodiments, the indication of a user is recorded by adjusting the significance value of the named entity. For example, a weighted adjustment amount may be determined based on the relationship between the user and the written work. The significance value of the named entity is adjusted by the weighted adjustment amount.

Figure 9:
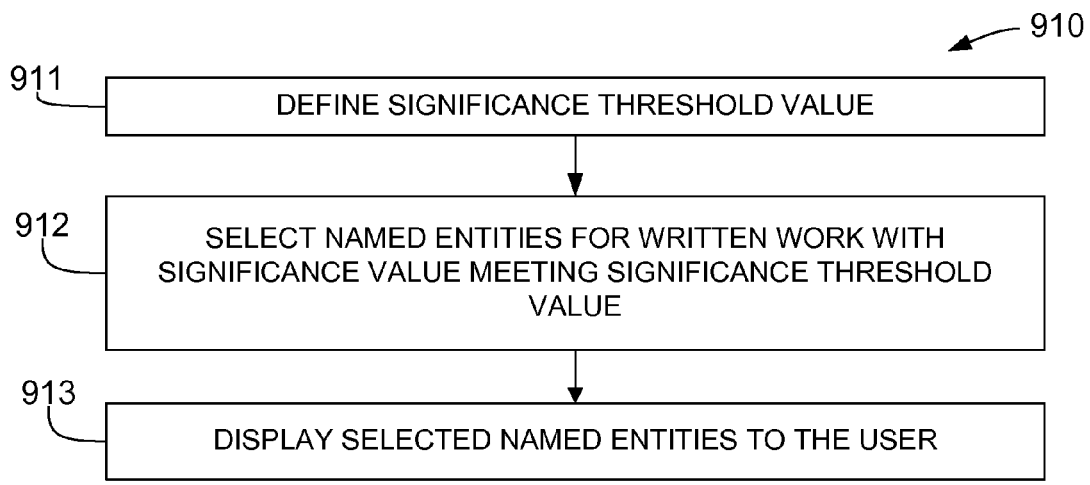
FIG. 9 is an example flow chart for limiting named entities displayed to a user based on the adjusted significance value of each named entity.

Referring next to FIG. 9, an example flow chart 910 presents a means for limiting named entities displayed (708 of FIG. 7) to a user based on the adjusted significance value of each named entity. In the flow chart 910, displaying at least one named entity associated with the written work to a user includes defining 911 a significance threshold value and selecting 912 from the named entities associated with the written work, the named entities having a significance value equal to or greater than the defined significance threshold value. The selected named entities are then displayed 913 to the user.

In some embodiments, the user is recognized as an author or publisher of the written work (e.g., the user logs in to validate such a role). A favorable vote weight or weighted adjusted amount is selected such that the indication of the user has a relatively strong effect on the significance value or corrected significance value of the character identity. For example, a vote of the user who is the author or publisher may be equal in weight to two votes of a user with no such relationship to the written work.

Figure 10:
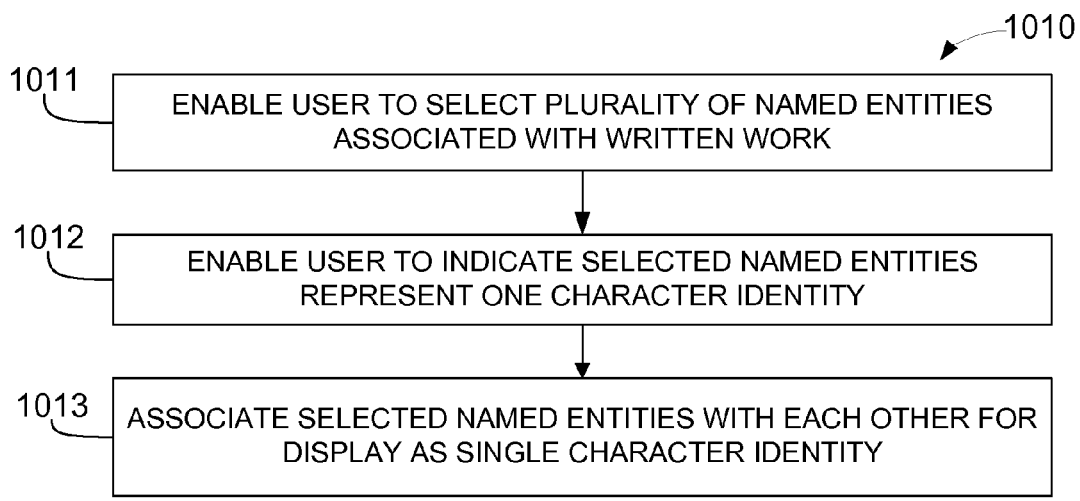
FIG. 10 is an example flow chart for enabling a user to indicate that a plurality of named entities represents a single character identity.

Referring next to FIG. 10, an example flow chart 1010 depicts a method for enabling a user to indicate that a plurality of named entities represents a single character identity. The user is enabled 1011 to select a plurality of named entities associated with the written work and indicate 1012 that the selected named entities represent a single character identity. In response to the user indicating the selected named entities represent a single character identity, the selected named entities are associated 1013 with each other for later display as a single character identity.

In one embodiment, a cluster score is calculated by combining the significance values of the selected named entities. For example, two named entities may be selected: "Jane" with a significance value of 0.3, and "Jane Doe" with a significance value of 0.5. As illustrated in FIG. 13C, the significance values 0.3 and 0.5 may be combined to calculate a cluster score for the two named entities by adding them together. Alternatively, one or more significance metrics may be recalculated with the two character identities treated as one. Using FIGS. 13A and 13B as an example, the absolute frequencies of Character13 and Character15 (71 and 62, respectively) may be added together to produce a combined absolute frequency of 133. The list of character identities may be sorted again, placing the combined Character13/Character15 between Character8 (with an absolute frequency of 150) and Character9 (with an absolute frequency of 130). One or more of the other significance metrics may be recalculated, according to the same process(es) described above in relation to Table 1. Other methods of combining significance values are also contemplated.

Once the significance values are combined, a cluster score threshold is defined. When a user indicates that two or more selected named entities represent a single character identity, the cluster score for the selected named entities is compared to the cluster score threshold. If the cluster score for the selected named entities meets the cluster score threshold, the named entities are immediately associated with each other for later display as a single character identity. If the cluster score does not meet the cluster score threshold, the named entities are associated with each other as a pending change. Another user or users may then be allowed to review and approve or disapprove the pending change. The pending change may be made effective if it receives a specified number of approving votes, in which case the selected named entities are displayed as a single character identity. Conversely, the system may remove the pending change if it receives a specified number of disapproving votes or if it fails to receive a specified number of approving votes in a specified amount of time. In some embodiments, a disapproved change is flagged as disapproved rather than being removed. If the change is submitted again in the future, it may be immediately disapproved or ignored based on the fact that it was previously flagged as disapproved. In some embodiments, a user is prevented from submitting a change that has previously been flagged as disapproved.

Figure 11:
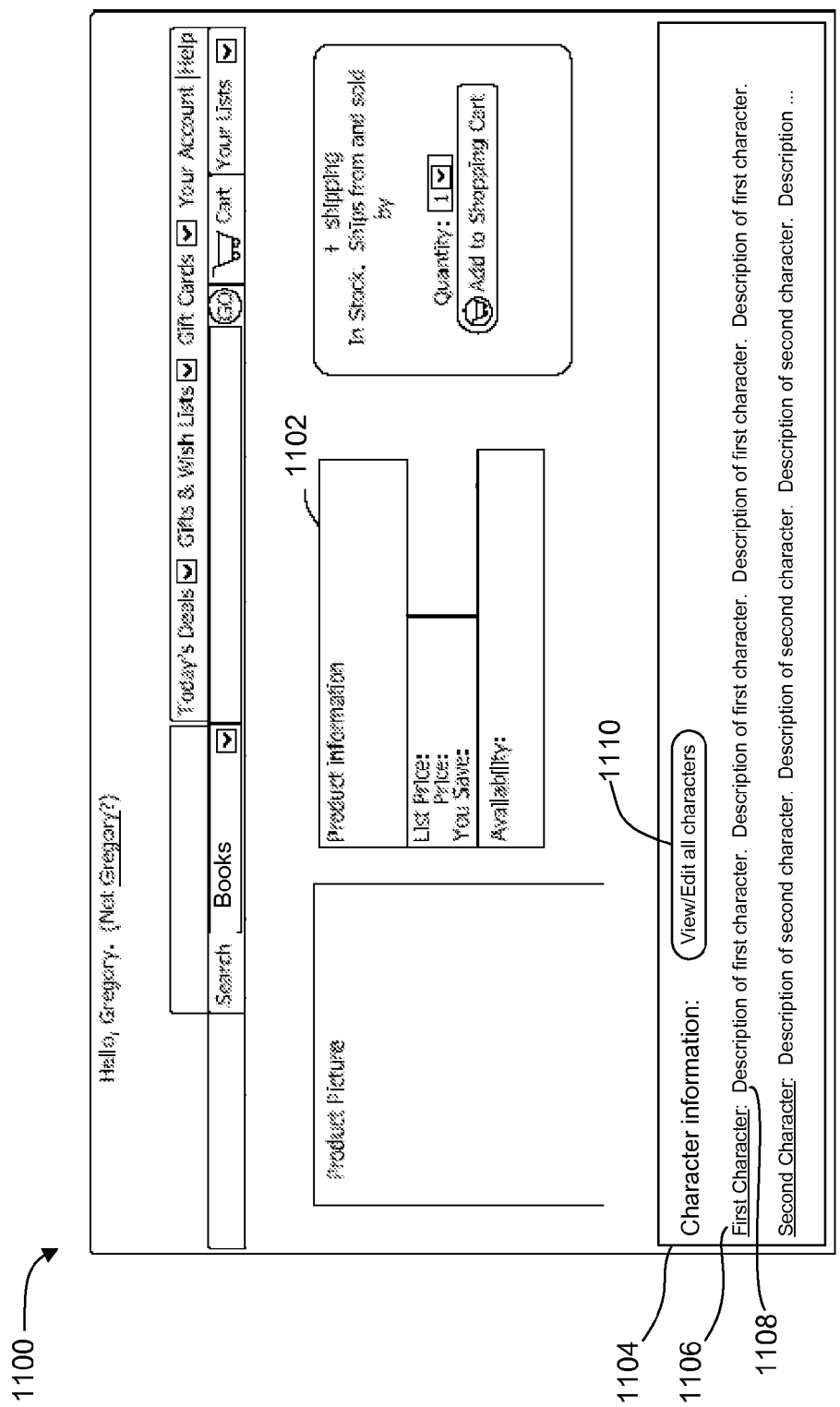
FIG. 11 is an example screen shot of a web page having product information.
Figure 12:
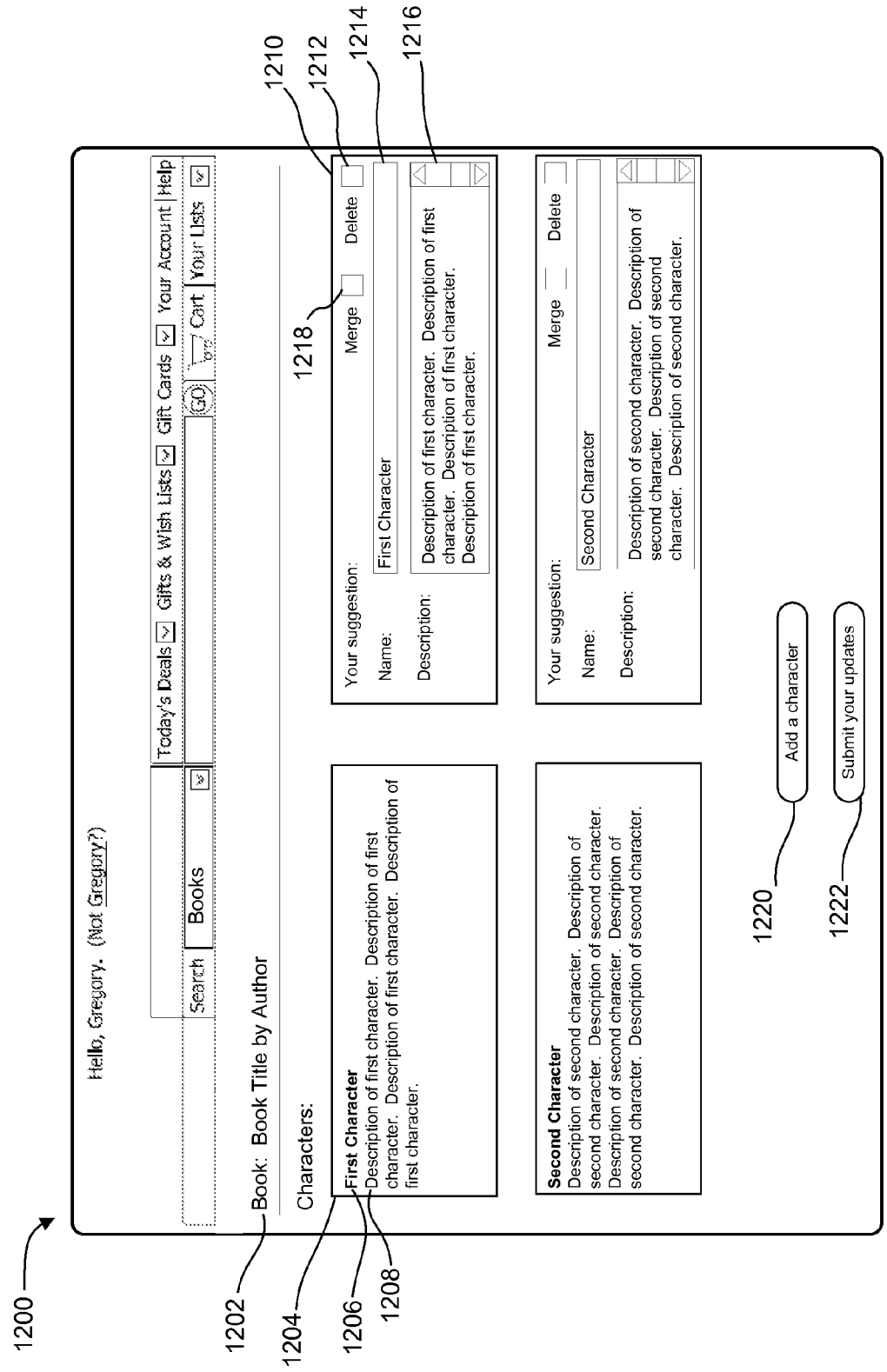
FIG. 12 is an example screen shot of a web page having character identity information.

FIGS. 11 and 12 provide screen shots for embodiments in which written works are included in a product catalog viewed by a computer user. The screen shots are provided for an exemplary nature only and are not intended to limit the scope of the embodiments. While FIGS. 11 and 12 depict web pages, other modes of information delivery are contemplated as well, including database interfaces and documents in general.

FIG. 11 is an example screen shot of a web page 1100 having product information 1102. Character information 1104 is provided, including a name 1106 and description 1108 for each character. The description may be abbreviated to conserve space on the page. A button 1110 is provided in some embodiments to allow navigation to a page listing character identities for the work in more detail, as illustrated in FIG. 11. Character name 1106 includes a link to detailed information about a particular character. It may lead a different page, or it may lead to the same page as button 1110, optionally scrolled as to place information about the particular character at or near the top of the browser.

FIG. 12 is an example screen shot of a web page 1200 having character identity information 1204. Basic book information 1202 is provided for context. Character information 1204 includes a character name 1206 and description 1208. A character update section 1210 is provided, including a deletion checkbox 1212, a name field 1214, a description text area 1216, and a merge checkbox 1218. Also provided are a character add button 1220 and submit button 1222. A user may modify the text in name field 1214 or description text area 1216 or may select the delete checkbox 1212 and select submit button 1222 to request that the specified changes be applied. A user may also select the merge checkbox 1218 in two or more character update sections 1210 and select submit button 1222 to request the specified characters be treated as one. A user may also select add button 1220 and be prompted for new character information.

FIGS. 13A and 13B depict an example table used in calculating significance values for character identities. Specifically, the table includes example significance metrics for 67 characters, presented in descending order of absolute frequency.

FIG. 13C depicts an example table used in calculating a cluster score for multiple named entities by combining significance values. Specifically, in this example, the significance value of each named entity is added together to produce a cluster score.

To increase accuracy of the identification of character identities, a user may be allowed to define NER parameters prior to execution of the NER software. For example, a user determines that certain portions of the work, such as an introduction, table of contents, or other portion, should be excluded from NER. In this case, the user may specify excluded portions or, inversely, specify included portions. Portions may be defined as contiguous sections of the work, with each section having a beginning position and a length or end position, where positions and length are measured in pages, paragraphs, or words, for example. Portions may also be defined to represent areas of scanned images that repeat throughout the work. For example, scanned pages may include a header with a book title or chapter title, which could skew NER results. The user may, in some embodiments, be provided a visual representation of a scanned page and allowed to define an area or areas on the page to be included or excluded. For example, the user may specify that only a region in the middle of each page, with a one-inch margin on each side, should be processed.

In another embodiment, the user is allowed to specify strings that should not be treated as named entities by the NER software. For example, the user may specify an author's name to ensure the author's name does not appear as a character identity for a work of fiction.

In another embodiment, the NER software has been "trained" to extract named entities using a body of texts for multiple literary genres (e.g., biography, novel), producing a configuration suitable for each genre. Prior to execution of the NER software, the user may be allowed to select a genre for the written work to be processed; the NER software then operates using a configuration corresponding to the selected genre.

In yet another embodiment, the user may be allowed to specify a list of nicknames prior to execution of the NER software. The specified list of nicknames may be used in resolving coreferences and in selecting a textual string to represent a character identity.

The embodiments above generally relate to the identification of character identity names and corresponding significance values. Other embodiments may further include identification of relationships between characters in a written work and association of the character identities (e.g., optionally represented by reference groups or named entities) with each other. When a character identity is displayed, information about related character identities may also be displayed. Further, links to related characters may be provided such that a user can navigate, for example, from a young child to the child's mother, or from a character to the character's employer.

It is also contemplated that, where a character identity appears in multiple written works, such as a series of novels, the corresponding character identity from each of the written works may be identified, and the resulting set of character identities may be merged into a single character identity which is associated with all the corresponding written works. If the separate corresponding character identities were associated with other character identities (e.g., a child-parent relationship), the merged character identity may include all such associations. The merged character identity may retain a significance value for each written work in which it appears, as a minor character in one work may play a major role in another work.

Further, because the invention takes advantage of named entity recognition, it is possible to extract from a written work other types of entities, such as locations, organizations, and dates. These entities may be subjected to the same methods described herein to determine a significance value. In the case of a location, a primary or canonical name may also be determined by the methods above. The use of a gazette or map data containing known location names may be especially helpful here. Also, locations may be classified (e.g., as a city or state) and may be associated with each other (e.g., Seattle is in King County, which is in Washington). In this case, locations may be displayed to a user in a hierarchical model such as a tree. Further, named entities representing the same location in different works may be merged into a single named entity which is associated with all the corresponding written works.

If the separate corresponding location named entities were associated with other location named entities, the merged named entity may include all such associations. The merged location may retain a significance value for each written work in which it appears. Locations may also be associated with character identities to represent the relationship between the two, and these associations may be displayed to a user to indicate, for example, that a character in a work was born in New York and lives in Paris. Similarly, organizations such as corporations or educational institutions may be identified, merged, and associated with character identities. For example, a character may be recognized as an employee or a student of an organization, though other relationships between character identities and organizations are also contemplated. Relationships between named entities other than character identities may also be recognized. For example, a corporation may be associated with a location or locations in which it operates.

Exemplary Operating Environment

A computing device or computer such as described herein has one or more processors or processing units and a system memory. The computer typically has at least some form of computer readable media. Computer readable media, which include both volatile and nonvolatile media, removable and non-removable media, may be any available medium that may be accessed by computer. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory includes computer storage media in the form of removable and/or non-removable, volatile and/or nonvolatile memory. The computer may operate in a networked environment using logical connections to one or more remote computers, such as a remote computer.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. Aspects of the invention may also be practiced in distributed computing environments where tasks are performed by remote processing devices that are linked through a communications network. In a distributed computing environment, program modules may be located in both local and remote computer storage media including memory storage devices.

In operation, a computer executes computer-executable instructions embodied in one or more computer-executable components stored on one or more computer-readable media to implement aspects of the invention described and/or illustrated herein.

The embodiments illustrated and described herein as well as embodiments not specifically described herein but within the scope of aspects of the invention constitute exemplary means for identifying character identities in a written work.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system comprising:
   a memory area for storing a catalog of products, wherein the catalog of products comprise written works, each written work having a plurality of character identities therein; and
   a processor programmed to:
   identify within a written work stored in the memory area textual strings each corresponding to one of the plurality of character identities therein;
   create character identity references for each of the identified textual strings, said character identity references including a textual string position of the said one of the identified textual strings within the written work;
   group the created character identity references by character identity to create reference groups;
   for each of the reference groups:
   select one of the textual strings from the character identity references in the reference group;
   determine a significance value for the reference group based on a quantity of the character identity references in the reference group and the textual string positions of the textual strings in the reference group; and
   associate the determined significance value with the reference group;
   arrange the reference groups based on the determined significance values to create an ordered list of the reference groups;
   store the ordered list of the reference groups in the memory area for association with the written work; and
   provide, with the at least one written work, the selected textual string from at least one of the reference groups in the ordered list of reference groups.

2. The system of claim 1, wherein selecting one of the textual strings from the character identity references in the reference group comprises selecting the longest textual string in the reference group if the longest textual string occurs more than once in the reference group, and, if not, selecting the textual string which occurs most frequently in the reference group.

3. The system of claim 1, wherein selecting one of the textual strings from the character identity references in the reference group comprises:
   comparing at least a portion of each of the textual strings in the reference group with a collection of standard names; and
   selecting the textual string in the reference group which most closely matches one of the names in the collection of standard names.

4. The system of claim 1, wherein selecting one of the textual strings from the character identity references in the reference group comprises:
   selecting textual strings from the character identity references in the reference group which are not a substring of any other textual string in the reference group to create a subset of textual strings; and
   selecting one of the textual strings from the created subset of textual strings.

5. The system of claim 1, wherein said processor is further configured to:
   identify a motion picture corresponding to the written work;
   identify a collection of motion picture character names associated with the identified motion picture; and for each reference group:
compare the textual strings in the reference group with the identified collection of motion picture character names;
select the motion picture character name from the identified collection of motion picture character names which most closely matches the textual strings in the reference group; and
associate the selected motion picture character name with the reference group.

6. The system of claim 5, wherein said processor is further configured to, for each of the reference groups:
determine a significance of the selected motion picture character name relative to the other motion picture character names in the identified collection of motion picture character names; and
adjust the significance value of the reference group based on the determined significance of the selected motion picture character name.

7. The system of claim 1, wherein creating the ordered list of the reference groups associated with the written work comprises:
defining a significance threshold value; and
selecting, from the ordered list of the reference groups associated with the written work, the reference groups having a significance value equal to or greater than the defined significance threshold value.

8. A method comprising:
producing a catalog of written works;
for each written work in the catalog:
identifying textual strings within the written work, each textual string corresponding to one of a plurality of character identities within the written work;
creating character identity references for each of the identified textual strings, said character identity references including a textual string position of the said one of the identified textual strings within the written work;
grouping the created character identity references by character identity to create reference groups;
for each of the reference groups:
selecting one of the textual strings from the character identity references in the reference group;
determining a significance value for the reference group based on a quantity of the character identity references in the reference group and the textual string positions of the textual strings in the reference group; and
associating the determined significance value with the reference group;
arranging the reference groups based on the determined significance values to create an ordered list of the reference groups; and
causing a display of the ordered list of the reference groups with at least one respective selected textual string on a computer system.

9. The method of claim 8, further comprising:
identifying a motion picture corresponding to the written work;
identifying a collection of motion picture character names from the identified motion picture; and
for each of the reference groups:
compare the textual strings in the reference group with the identified collection of motion picture character names;
selecting the motion picture character name from the identified collection of motion picture character names which most closely matches the textual strings in the reference group; and
associating the selected motion picture character name with the reference group.

10. The method of claim 9, further comprising:
for each of the reference groups:
determining a significance of the selected motion picture character name relative to the other motion picture character names in the identified collection of motion picture character names; and
adjusting the significance value of the reference group based on the determined significance of the selected motion picture character name.

11. The method of claim 8, wherein creating the ordered list of the reference groups associated with each written work comprises:
defining a significance threshold value; and
selecting, from the ordered list of reference groups associated with each written work, the reference groups having a significance value equal to or greater than the defined significance threshold value.

12. One or more computer-readable storage media storing computer-executable instructions that, when executed, cause one or more processors to perform acts comprising:
identifying textual strings within a written work, each textual string corresponding to one of the plurality of character identities;
creating character identity references for each of the identified textual strings, each character identity reference including a textual string position within the written work;
grouping the character identity references by character identity to create reference groups;
for each of the reference groups:
determining a significance value based on a quantity of the character identity references and the textual string positions within the written work; and
associating the determined significance value with the reference group;
arranging the reference groups based on the determined significance values to create an ordered list;
associating the ordered list with the written work;
identifying a motion picture corresponding to the written work;
identifying a collection of motion picture character names associated with the identified motion picture; and
associating each of the identified motion picture character names with at least one reference group.

13. The one or more computer-readable storage media of claim 12 storing computer-executable instructions that, when executed, cause one or more processors to perform further acts comprising:
for each reference group:
comparing the textual strings in the reference group with the identified collection of motion picture character names; and
selecting the motion picture character name from the identified collection of motion picture character names that most closely matches the textual strings in the reference group.

14. The one or more computer-readable storage media of claim 13 storing computer-executable instructions that, when executed, cause one or more processors to perform further acts comprising:

determining a significance of the selected motion picture character name relative to the other motion picture character names in the identified collection of motion picture character names; and adjusting the significance value of the reference group based on the determined significance of the selected motion picture character name.

15. A method comprising:

under control of one or more processors configured with executable instructions, recognizing textual strings within a written work, each of the textual strings corresponding to one of a plurality of named entities and having a position within the written work;

grouping the textual strings by named entity;

for each of the named entities:

determining a significance value for the named entity based on a quantity of textual strings corresponding to the named entity; and associating the named entity with the written work;

determining an ordered list of the named entities based at least in part on the determined significance values;

storing the ordered list of the named entities in a memory for association with the written work;

identifying a motion picture corresponding to the written work;

identifying one or more motion picture character names from the identified motion picture; and associating each selected motion picture character name with a named identity.

16. The method of claim 15, further comprising:

for each of the named entities:

comparing the textual strings with the identified one or more motion picture character names; and selecting a motion picture character name from the identified one or more motion picture character names which most closely matches the textual strings for the named identity.

17. The method of claim 15, further comprising:

determining a significance of the selected motion picture character name relative to the other motion picture character names in the identified one or more motion picture character names; and adjusting the significance values of the named entities based on the determined significance of the selected motion picture character name.

\* \* \* \* \*